(12) United States Patent
Trainin et al.

(10) Patent No.: US 7,424,269 B2
(45) Date of Patent: Sep. 9, 2008

(54) SYSTEM, METHOD AND DEVICE OF RADAR DETECTION

(75) Inventors: Solomon B. Trainin, Haifa (IL); Jorge Myszne, Zikron Ya'akov (IL); Oded Liron, Givaat Ada (IL)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 11/237,784

(22) Filed: Sep. 29, 2005

(65) Prior Publication Data

US 2007/0082691 A1   Apr. 12, 2007

(51) Int. Cl.
*H04B 17/00* (2006.01)
(52) U.S. Cl. ............... 455/67.13; 455/67.11; 455/63.1; 455/296; 455/226.2; 455/226.3; 342/159; 342/192; 342/195; 342/57
(58) Field of Classification Search ............ 455/67.11, 455/67.13, 63.1, 41.2, 296, 226.2, 226.3; 375/340, 220, 254; 370/252, 329; 342/57, 342/58
See application file for complete search history.

(56) References Cited

U.S. PATENT DOCUMENTS

| | | | |
|---|---|---|---|
| 5,990,833 A * | 11/1999 | Ahlbom et al. | 342/417 |
| 6,078,281 A * | 6/2000 | Milkovich et al. | 342/196 |
| 6,177,904 B1 * | 1/2001 | Coenen et al. | 342/62 |
| 6,670,905 B1 * | 12/2003 | Orr | 342/20 |
| 6,864,831 B2 * | 3/2005 | Woodington et al. | 342/70 |
| 6,870,815 B2 * | 3/2005 | McFarland et al. | 370/250 |
| 6,891,496 B2 * | 5/2005 | Husted et al. | 342/57 |
| 6,941,110 B2 * | 9/2005 | Kloper et al. | 455/67.11 |
| 6,954,171 B2 * | 10/2005 | Husted et al. | 342/57 |
| 7,035,593 B2 * | 4/2006 | Miller et al. | 455/67.11 |
| 7,071,868 B2 * | 7/2006 | Woodington et al. | 342/70 |
| 7,107,032 B2 * | 9/2006 | Li | 455/296 |
| 7,116,943 B2 * | 10/2006 | Sugar et al. | 455/67.11 |
| 7,269,151 B2 * | 9/2007 | Diener et al. | 370/329 |
| 2003/0107512 A1 * | 6/2003 | McFarland et al. | 342/159 |

OTHER PUBLICATIONS

IEEE Std. 802.11h—2003, IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 5: Spectrum and Transmiy Power Management Extensions in the 5GHz Band in Europe, pp. 1-75.

(Continued)

*Primary Examiner*—Marceau Milord
(74) *Attorney, Agent, or Firm*—Pearl Cohen Zedek Latzer, LLP

(57) ABSTRACT

Embodiments of the present invention provide a method, apparatus and system of radar detection. The method, according to some demonstrative embodiments of the invention, may include comparing an energy level of signals received over a wireless communication channel to a threshold; during operation of a processor, if the energy level is above the threshold, determining independently of the processor one or more time values related to said signals; and if the energy level decreases to or below the threshold, interrupting the operation of the processor to determine, based on the time values, one or more parameters of a detection time period during which the energy level was above the threshold. Other embodiments are described and claimed.

16 Claims, 4 Drawing Sheets

OTHER PUBLICATIONS

ETSI EN 301 893 V1.2.3 (Aug. 2003), Candidate Harmonized European Standard (Telecommunications Series), Broadband Radio Access Networks (BRAN); 5GHz High Performance RLAN; Harmonized EN Covering Essential Requirements of Articles 3.2 of the R&TTE Directive, pp. 1-43.

Recommendation ITU-R M.1638, Characteristics of the and protection criteria for sharing studies for radiolocation, aeronautical radionavigation and meterological radars operating in the frequency bands between 5 250 and 5 850 MHz, 2003, pp. 1-10.

* cited by examiner

SYSTEM, METHOD AND DEVICE OF RADAR DETECTION

BACKGROUND OF THE INVENTION

A wireless communication station may receive signals over a communication channel, e.g., a communication channel between the station and an Access Point (AP).

According to the 802.11h standard, the station may be required to detect a radar transmission, and to avoid performing a wireless transmission over the communication channel if a radar transmission is detected.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
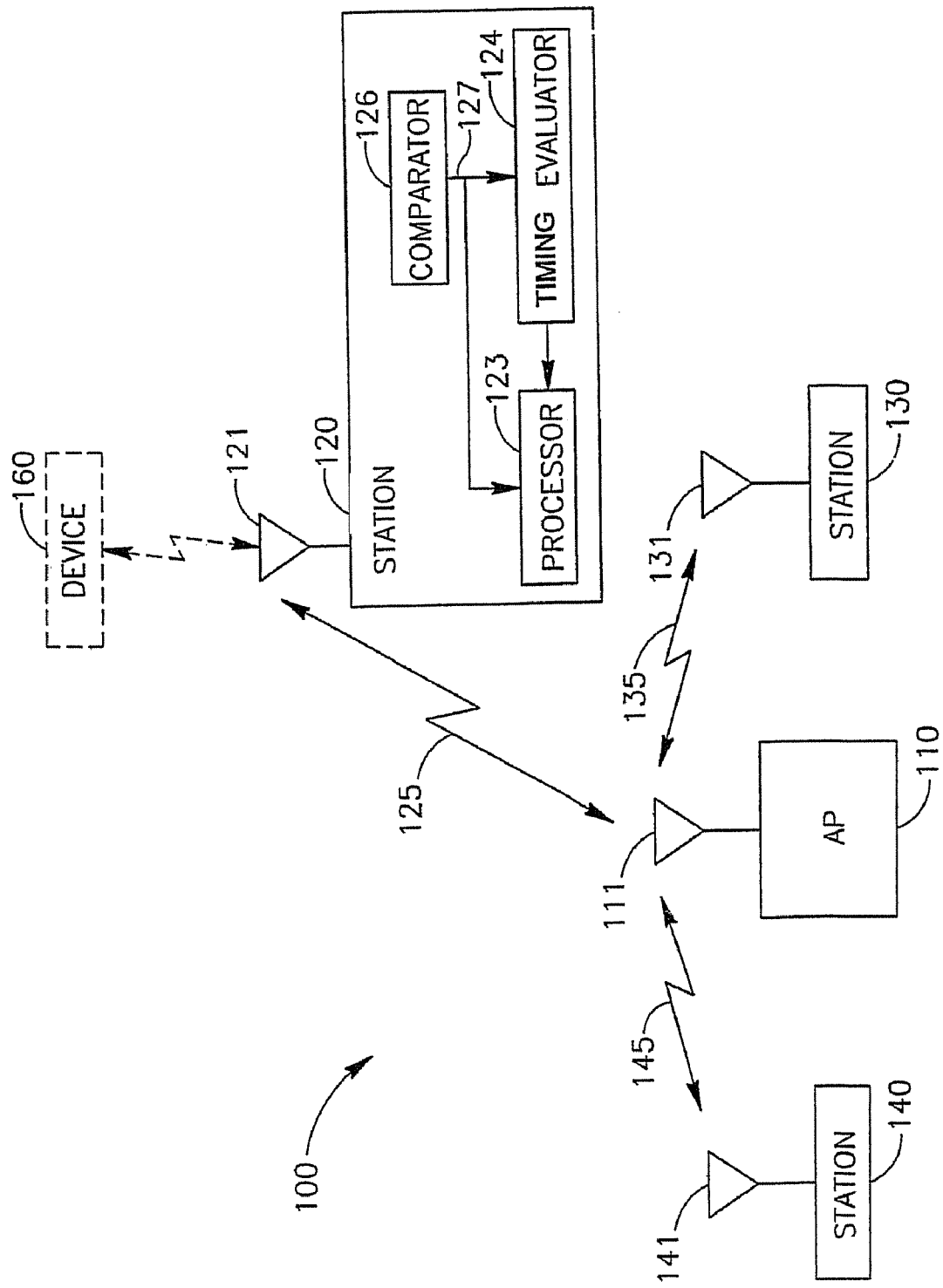
FIG. 1 is a schematic diagram of a wireless communication system in accordance with some demonstrative embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) communication system and/or in any other unit and/or device. Units of a WLAN communication system intended to be included within the scope of the present invention include, by way of example only, modems, Mobile Units (MU), Access Points (AP), wireless transmitters/receivers, and the like.

Types of WLAN communication systems intended to be within the scope of the present invention include, although are not limited to, WLAN communication systems as described by "IEEE-Std 802.11, 1999 Edition (ISO/IEC 8802-11: 1999)" standard ("the 802.11 standard"), and more particularly in "IEEE-Std 802.11h-2003 Amendment 5:Spectrum and Transmit Power Management Extensions in the 5 GHz band in Europe"; "Recommendation ITU-R M. 1638:Characteristics of and protection criteria for sharing studies for radiolocation, aeronautical radionavigation and meteorological radars operating in the frequency bands between 5250 and 5850 MHz", 2003; "European Telecommunication Standards Institute (ETSI) EN 301 893 V1.2.3 (2003-08): Broadband Radio Access Networks (BRAN); 5 GHz high performance RLAN; Harmonized EN covering essential requirements of article 3.2 of the R&TTE Directive (2003)", and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Part of the discussion herein may relate, for exemplary purposes, to receiving and/or transmitting a signal over a channel. However, embodiments of the invention are not limited in this regard, and may include, for example, receiving and/or transmitting a frame, a block, a data portion, a data sequence, a packet, a data signal, a preamble, a signal field, a content, an item, a message, a protection frame, or the like.

Reference is made to FIG. 1, which schematically illustrates a wireless communication system 100 in accordance with an embodiment of the present invention.

In some demonstrative embodiments of the invention, communication system 100 may include a WLAN system. Although the scope of the present invention is not limited in this respect, communication system 100 may be defined, by the 802.11 standard, as a Basic Service Set (BSS). For example, the BSS may include at least one communication station, for example, an AP 110, and stations 120, 130, and 140 at least one of which may be a MU. In some embodiments, stations 140, 130 and 120 may transmit and/or receive one or more packets over wireless communication system 100. The packets may include data, control messages, network information, and the like. Additionally or alternatively, in other embodiments of the present invention, wireless communication system 100 may include two or more APs, two or more mobile stations, and/or any other communication device, e.g., including a wired device, in which case wireless communication system 100 may be referred to as an extended service set (ESS), as defined by the 802.11 standard, although the scope of the present invention is not limited in this respect.

According to some demonstrative embodiments of the invention, AP 110 may include one or more antennas 111 for transmitting and/or receiving packets, e.g., to/from stations 120, 130 and/or 140. Stations 120, 130 and/or 140 may include one or more antennas 121, 131 and/or 141, respectively, for transmitting and/or receiving packets, e.g., to/from AP 110. Although the scope of the present invention is not limited in this respect, types of antennae that may be used for antennas 111, 121, 131, and/or 141 may include but are not limited to internal antenna, dipole antenna, omni-directional antenna, a monopole antenna, an end fed antenna, a circularly polarized antenna, a micro-strip antenna, a diversity antenna and the like.

According to some demonstrative embodiments of the invention, one or more stations of system 100, e.g., station 120, may receive signals over a communication channel, e.g., a communication channel between station 120 and AP 110. Station 120 may determine whether the received signals correspond to a radar transmission, e.g., of a device 160.

In some demonstrative embodiments of the invention, the radar transmission may include signals of predetermined frequencies, e.g., within the frequency ranges 5250-5350 MHZ, and/or 5470-5725 MHZ. The radar transmission produced by a radar device, e.g., device 160, may be characterized by one or more radar-related attributes. The radar transmission may be characterized, for example, by a burst period, denoted B, during which a sequence of radar pulses may be transmitted. The radar pulses may be transmitted during time periods of a substantially constant length ("the pulse width"), denoted W. The radar pulses may be transmitted repeatedly at a substantially constant repetition frequency, denoted PRF. The pulse width W may have, for example, a value within the range of 0.1-100 microseconds; and the repetition frequency may be, for example, within the range of 20-100000 pulses-per-second (pps).

According to some demonstrative embodiments of the invention, station 120 may determine one or more parameters corresponding to the received signals, e.g., as described below. Station 120 may also determine one or more attribute values, for example, a pulse width and/or a repetition frequency, corresponding to the received signals, e.g., as described below. Station 120 may also compare the attribute values of the received signals to attributes of one or more predetermined radar transmissions. Station 120 may determine that the received signals correspond to a radar transmission, e.g., if the attribute values of the received signals correspond to the attributes of one or more of the predetermined radar transmissions. Station 120 may avoid performing a wireless transmission over the communication channel during a time period in which it is determined that the received signals correspond to the radar transmission ("the radar time period").

According to some demonstrative embodiments of the invention, station 120 may include a processor 123 to process transmissions to/from station 120, e.g., as is known in the art.

According to some demonstrative embodiments of the invention, station 120 may also include a comparator 126 to compare an energy level of the received signals to a threshold. The threshold may correspond, for example, to an energy level associated with radar transmissions, e.g., as described below. Comparator 126 may also enable a detection signal 127 during a detection time period in which the energy level is higher than the threshold; and disable signal 127, e.g., when the energy level is equal to or lower than the threshold, e.g., as described below.

According to some demonstrative embodiments of the invention, station 120 may also include a timing evaluator 124 to determine, based on detection signal 127, one or more time values relating to the received signals. For example, evaluator 124 may determine the one or more time values during operation of processor 123 and/or independently of processor 123, e.g., as described below.

According to some demonstrative embodiments of the invention, processor 123 may determine, based on the time values, one or more parameters, e.g., a pulse width and/or a PRF, corresponding to the received signals. For example, the operation of processor 123 may be interrupted, e.g., if detection signal 127 indicates the energy level decreases to or below the threshold, to determine the one or more parameters, e.g., as described in detail below.

Thus, according to some demonstrative embodiments of the invention, timing evaluator 124 may determine the one or more time values corresponding to the received signals, while processor 123 may perform one or more transmission-related operations, e.g., processing one or more received packets, and/or one or more packets intended for transmission. Processor 123 may be interrupted to determine the one or more parameters corresponding to the received signals, e.g., after timing evaluator has determined the time values.

Figure 2:
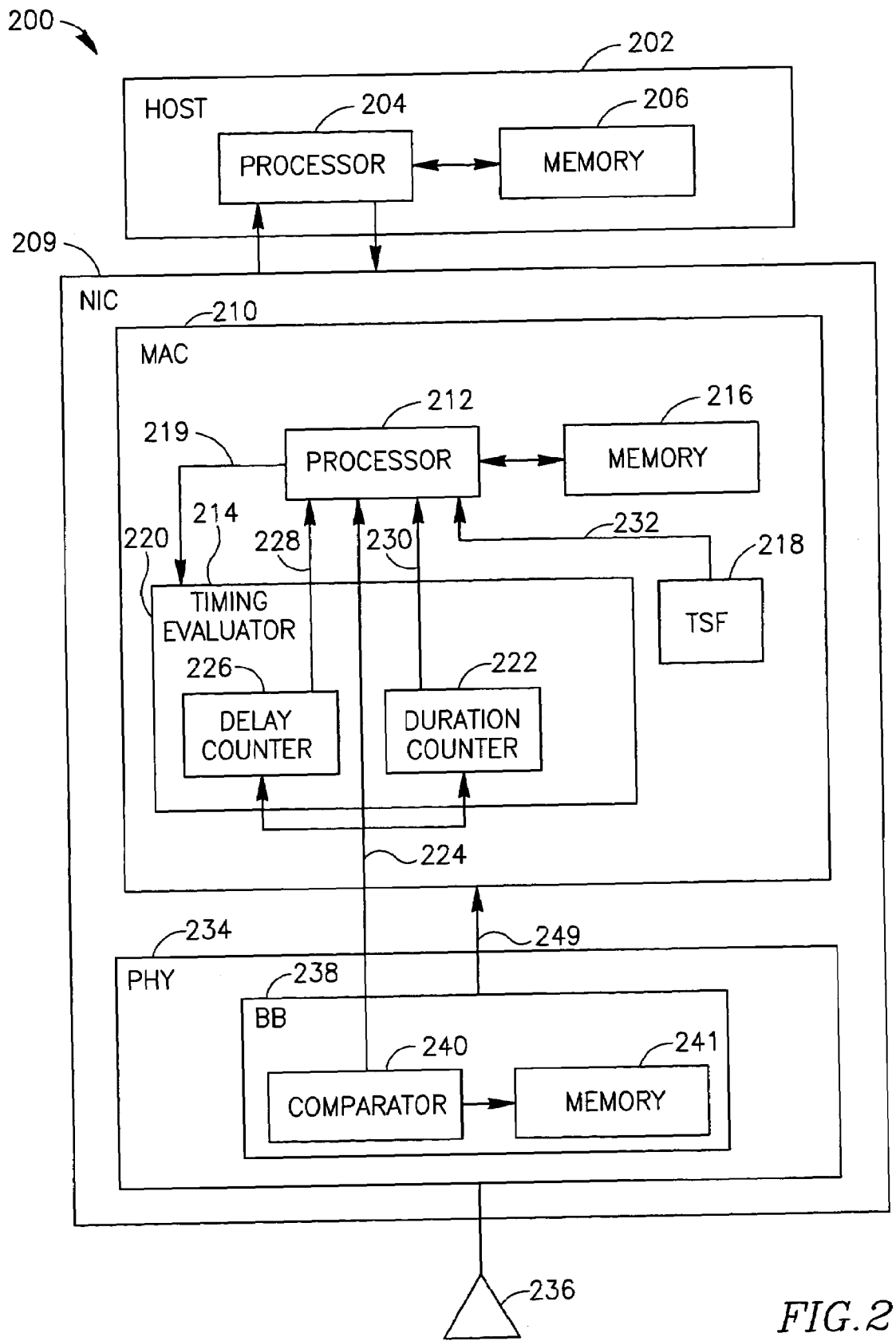
FIG. 2 is a schematic illustration of a communication station in accordance with some demonstrative embodiments of the invention.

Reference is made to FIG. 2, which schematically illustrates a station 200 in accordance with some demonstrative embodiments of the invention. Although the invention is not limited in this respect, station 200 may be used to perform the functionality of at least one of stations 120, 130 and 140 (FIG. 1).

According to some demonstrative embodiments of the invention, station 200 may include a host 202 associated with a wireless communication module, e.g., a Network Interface Card (NIC) 209, as are described in detail below.

In some embodiments, host 202 may include or may be, for example, a computing platform, e.g., a personal computer, a desktop computer, a mobile computer, a laptop computer, a notebook computer, a terminal, a workstation, a server computer, a Personal Digital Assistant (PDA) device, a tablet computer, a network device, or other suitable computing device.

According to some demonstrative embodiments of the invention, host 202 may include a processor 204 associated with a memory 206. Processor 204 may include, for example, a Central Processing Unit (CPU), a Digital Signal Processor (DSP), a microprocessor, a host processor, a plurality of processors, a controller, a chip, a microchip, or any other suitable multi-purpose or specific processor or controller. Processor 204 may provide NIC 209 with frames intended to be transmitted over a wireless communication channel, and/or to process frames received from NIC 209, e.g., as is known in the art.

According to some demonstrative embodiments of the invention NIC 204 may include a Media Access Controller (MAC) 218, a Physical layer (PHY) 275, and one or more antennas 216, as are described below.

According to some demonstrative embodiments of the invention, PHY 234 may include a Base-Band (BB) module 238 to handle signals received over a communication channel via one or more antennas 236 ("the received signals"). For example, BB module 238 may provide MAC 210 with signals 249 corresponding to the received signals, e.g., as is known in the art.

According to some demonstrative embodiments of the invention, BB 238 may include a comparator 240 to compare an energy level of the received signals to a threshold. The threshold may be based, for example, on one or more energy levels corresponding to one or more radar transmission types. For example, the threshold may be determined based on one, e.g., the lowest one, of the energy levels corresponding to the one or more radar transmission types. Comparator 240 may include suitable comparator, e.g., as is known in the art.

According to some demonstrative embodiments of the invention, it may be possible that the received signals correspond to a radar transmission, e.g., if the energy level of the received signals is higher than the threshold.

According to some demonstrative embodiments of the invention, comparator 240 may generate a detection signal 224 indicative of whether the energy level of the received signals is higher than the threshold. For example, comparator 240 may assert detection signal 224, e.g., during a time period in which the energy level of the received signals is higher than the threshold; and de-assert detection signal 224, e.g., when the energy level of the received signals is equal to or lower than the threshold.

According to some demonstrative embodiments of the invention, BB module 238 may also include a memory 241 to store the energy level of the received signals. Memory 241 may include any suitable memory unit, memory device, memory article, memory medium, storage device, storage article, storage medium and/or storage unit, as are known in the art.

Some demonstrative embodiments of the invention relate to a PHY, e.g., PHY 234, including a comparator, e.g., comparator 240, and a memory, e.g., memory 241, implemented as part of a BB module, e.g., BB module 230. However, it will be appreciated by those skilled in the art that in other embodiments of the invention the BB module, the comparator, and/or the memory may be implemented as separate unit and/or elements of the PHY.

According to some demonstrative embodiments of the invention, MAC 210 may include a processor 212 to process the transmission of packets corresponding to the frames received from processor 204; and/or to process signals 249, e.g., as is known in the art. Processor 212 may include, for example, a CPU, a DSP, a microprocessor, a plurality of processors, a controller, a chip, a microchip, or any other suitable multi-purpose or specific processor or controller.

According to some demonstrative embodiments of the invention, MAC 210 may also include a timing evaluator 220 to determine, based on detection signal 224, one or more time values relating to the received signals, e.g., as described below.

According to some demonstrative embodiments of the invention, timing evaluator 220 may determine the time values during operation of processor 212, and/or independently of the operation of processor 204, e.g., as described below.

According to some demonstrative embodiments of the invention, the operation of processor 212 may be interrupted, e.g., based on signal 224, to determine one or more parameters of a time period during which the energy level of the received signals was above the threshold ("the detection time period"), e.g., as described below.

According to some demonstrative embodiments of the invention, processor 212 may selectively enable or disable the operation of timing evaluator 220 using control signals 219, e.g., as described below.

According to some demonstrative embodiments of the invention, timing evaluator 220 may include a duration counter 222, and a delay counter 226.

According to some demonstrative embodiments of the invention, the operation of counter 222, and/or counter 226 may be selectively enabled or disabled by processor 212, e.g., using control signals 219, for example, based on the frequency range of the wireless communication channel of the received signals. For example, processor 212 may enable the operation of counters 222 and/or 226 if the frequency range of the communication channel at least partially overlaps one or more radar-related frequency ranges, e.g., the frequency ranges 5250-5350 MHZ, and/or 5470-5725 MHZ.

According to some demonstrative embodiments of the invention, counter 222 may measure a time period, during which signal 224 is asserted, and maintain a first time value corresponding to the measured time period. For example, counter 222 may be activated to begin counting when signal 224 is asserted; and disabled when signal 224 is de-asserted. Counter 222 may include any suitable counter or timer, e.g., as known in the art.

According to some demonstrative embodiments of the invention counter 226 may determine a second time value corresponding to a time period between a time in which signal 224 changes from being asserted to being de-asserted, and a time in which the second time value is retrieved from counter 226. For example, counter 226 may be activated to begin counting when signal 224 changes from being asserted to being de-asserted. The second time value may correspond, for example, to a delay time period between the end of the detection time period and the time in which the second time value is retrieved from counter 226, e.g., as described below.

According to some demonstrative embodiments of the invention, processor 212 may be interrupted, e.g. if signal 224 changes from being asserted to being de-asserted, e.g., when the energy level of the received signals decreases to or below than the threshold. Processor 212 may retrieve the first value from counter 222, and/or the second value from counter 226, e.g., after processor 212 is interrupted by signal 224. Processor 212 may also determine a third time value corresponding to a time at which the first and/or second values are retrieved. For example, processor 212 may retrieve a Time Synchronization Function (TSF) value from a TSF module 218, e.g., substantially at the same time that processor 212 retrieves the second time value from counter 226. TSF module 218 may include any suitable TSF hardware and/or software, e.g., as is known in the art.

According to some demonstrative embodiments of the invention, processor 212 may determine one or more parameters based on the first, second and/or third time values. For example, processor 212 may determine a first parameter, e.g., a pulse width, corresponding to the received signals, based on the first time value. Processor 212 may also determine a second parameter, e.g., corresponding to the end time of the detection period. For example, processor 212 may determine the second parameter based on the second and third time values. For example, processor 212 may determine the second parameter by subtracting the third time value from the second time value, e.g., since the second time value may correspond to the delay period between the end of the detection period and the time at which processor 212 determines the third time value.

According to some demonstrative embodiments of the invention, processor 212 may store a set of the one or more parameters in a memory 216. Memory 216 may include any suitable memory unit, memory device, memory article, memory medium, storage device, storage article, storage medium and/or storage unit, as are known in the art.

According to some demonstrative embodiments of the invention, processor 212 may disable timing evaluator 220, e.g., using signals 219, for example, if processor 212 determines the received signals correspond to a wireless communication packet. For example, processor 212 may disable the timing evaluator 220 if processor 212 determines the received signals correspond to a valid packet preamble.

According to some demonstrative embodiments of the invention, processor 212 may determine additional parameter sets corresponding to signals received during additional detection time periods, e.g., in analogy to determining of the parameter set described above. Processor 212 may store the additional parameter sets in memory 216.

According to some demonstrative embodiments of the invention, processor 212 may process the parameter sets to determine whether the received signals correspond to a radar transmission. For example, processor 212 may determine one or more attribute values, e.g., a pulse width value, and/or a PRF, corresponding to the parameter sets. Processor 212 may implement any suitable method to detect a correlation between the attribute values corresponding to the parameter sets and one or more predetermined radar attributes.

According to other demonstrative embodiments of the invention, processor 212 may provide processor 204 with a plurality of parameter sets, e.g., when memory 216 includes parameter sets corresponding to at least a predetermined number of detection periods. Processor 204 may process the parameter sets to determine whether the received signals correspond to a radar transmission. For example, processor 204 may determine one or more attribute values, e.g., a pulse width value, and/or a PRF, corresponding to the parameter sets. Processor 204 may implement any suitable method to detect a correlation between the attribute values corresponding to the parameter sets and one or more predetermined radar attributes.

Figure 3:
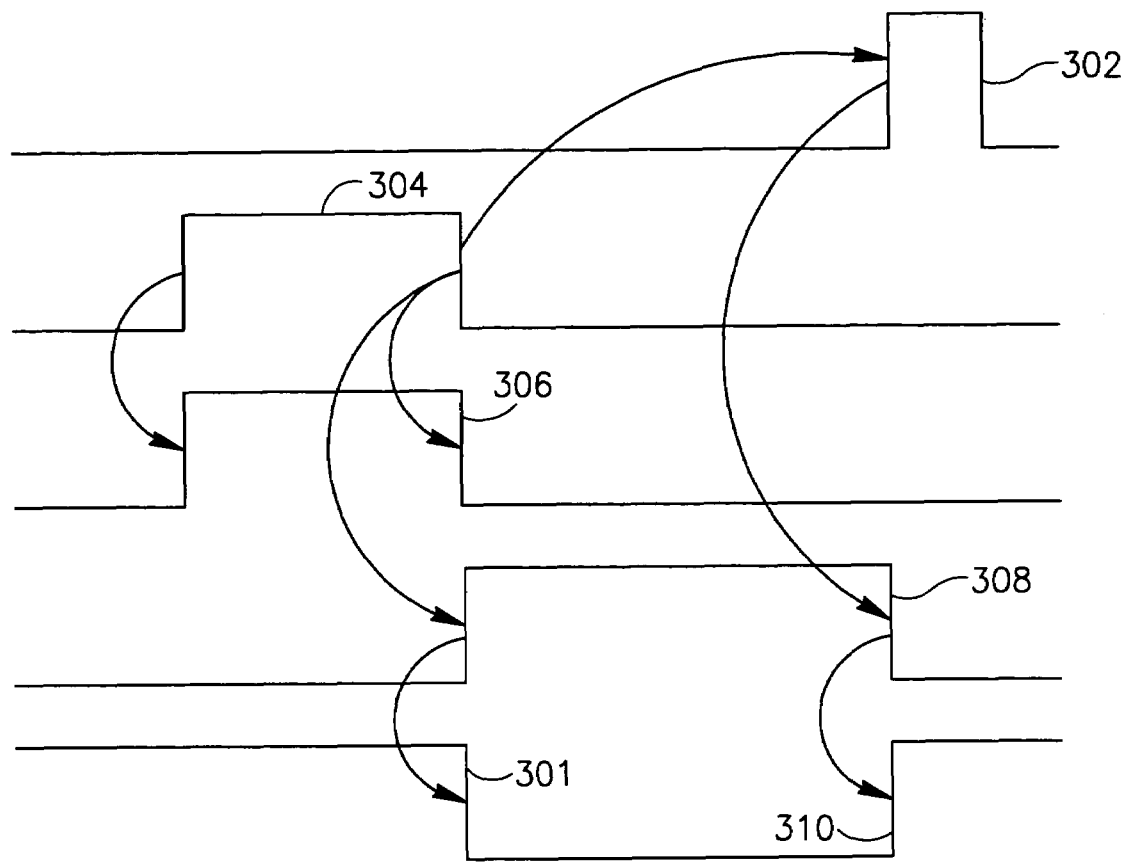
FIG. 3 is a schematic illustration of a sequence of operations performed by the station of FIG. 2 in accordance with some demonstrative embodiments of the invention.

Reference is also made to FIG. 3, which schematically illustrates a sequence of operations performed by the station of FIG. 2 in accordance with one demonstrative embodiment of the invention.

Although the invention is not limited in this respect, the sequence of operations illustrated in FIG. 3, may be performed by station 200, for example, to determine one or more of the time values corresponding to the received signals.

As illustrated in FIG. 3, comparator 240 may assert detection signal 224 during a period 304, e.g., in which the energy level of the received signals is above the threshold. Comparator 240 may de-assert detection signal 224 at the end of period 304.

As illustrated in FIG. 3, duration counter 222 may be enabled by detection signal 224 to measure a detection period 306, e.g., corresponding to period 304.

As illustrated in FIG. 3, delay counter 226 may be enabled to measure a delay period 308 between a time when detection signal indicates the energy level of the received signals decreases to or below the threshold, and a time when the second time value is retrieved from counter 226, e.g., as described above.

As illustrated in FIG. 3, processor 212 may be interrupted by detection signal 224 to retrieve during a period 302 the first and/or second time values from counters 222 and/or 226, respectively. The period 302 may be delayed compared to the end of period 306. Processor 212 may then determine the end of detection period 304, e.g., as described above.

As illustrated in FIG. 3, station 200 may be able to determine whether signals received during time periods 301 and/or 310 correspond to a radar transmission.

Figure 4:
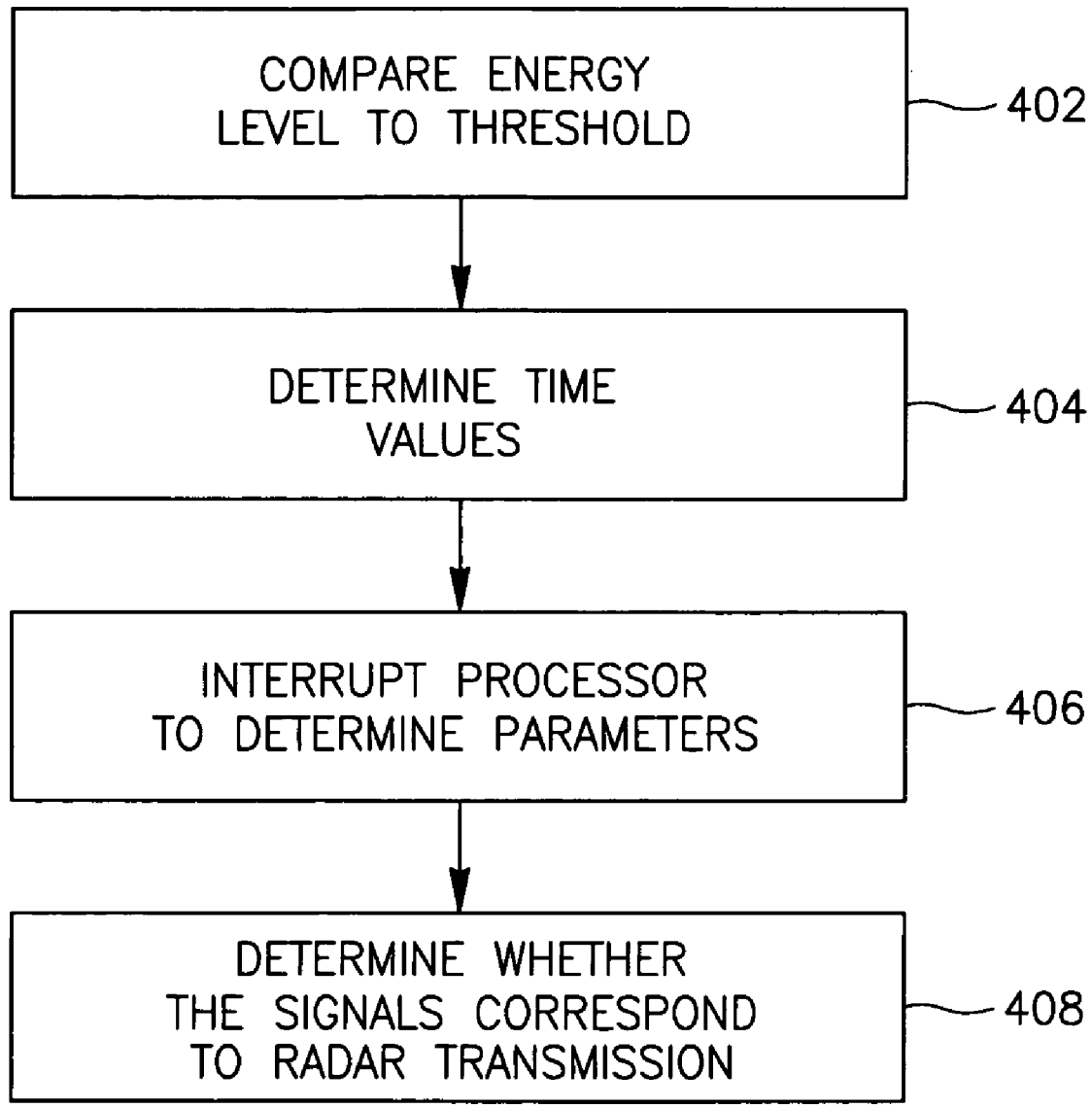
FIG. 4 is a schematic flow-chart illustration of a method of detecting a radar transmission, in accordance with some demonstrative embodiments of the invention.

Reference is now made to FIG. 4, which schematically illustrates a method of detecting a radar transmission in accordance with some demonstrative embodiments of the invention.

As indicated at block 400, in some demonstrative embodiments of the invention the method may include comparing an energy level of signals received over a wireless communication channel to a threshold. For example a comparator may compare the energy level to the threshold, e.g., as described above with reference to FIG. 2.

As indicated at block 404, the method may also include, during operation of a processor, determining independently of the processor one or more time values related to the received signals, e.g., if the energy level is above the threshold. For example, a timing evaluator may be used to determine the time values, e.g., as described above with reference to FIG. 2. The time values may include, for example, the duration of a detection time period during which the energy level was above the threshold; and/or a delay period, e.g., as described above with reference to FIG. 2.

As indicated at block 406, the method may also include interrupting the operation of the processor to determine, based on the time values, one or more parameters of the detection time period, e.g., if the energy level decreases to or below the threshold.

As indicated at block 408, the method may also include determining whether the received signals correspond to a radar transmission based on the one or more parameters.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
   comparing an energy level of signals received over a wireless communication channel to a threshold;
   during operation of a processor, if said energy level is above said threshold, determining independently of said processor one or more time values related to said signals; and
   if said energy level decreases to or below said threshold, interrupting the operation of said processor to determine, based on said time values, one or more parameters of a detection time period during which said energy level was above said threshold, wherein the time values comprise a first time value corresponding to a first time period in which the energy level is above said threshold and a second time value corresponding to a time period between the end of the first time period and a time in which the second time value being retrieved.

2. The method of claim 1 comprising determining whether said signals correspond to a radar transmission based on said one or more parameters.

3. The method of claim 1 comprising determining a pulse width and a pulse repetition frequency corresponding to said received signals based on said time values.

4. The method of claim 1, wherein determining said parameters comprises determining a length of said detection time period.

5. The method of claim 1, wherein determining said parameters comprises determining an end of said detection time period.

6. The method of claim 5 comprising determining the time at which said energy level decreases to or below said threshold.

7. The method of claim 6, wherein determining the end of said detection time period comprises:
   storing a stamp-time value corresponding to a stamp time after the time at which said energy level decreases to or below said threshold;
   measuring a delay between the time at which said energy decreases to or below said threshold and said stamp time; and
   determining the end of said time period based on said stamp-time value and said delay.

8. An apparatus comprising:
   a comparator to compare an energy level of signals received over a wireless communication channel to a threshold, and to assert a detection signal during a detection time period in which said energy level is higher than said threshold;
   a timing evaluator to determine, based on said detection signal, one or more time values relating to said signals, wherein the time values comprise a first time value corresponding to a first time period in which the energy level is above said threshold and a second time value corresponding to a time period between the end of the first time period and a time in which the second time value being retrieved; and
   a processor to determine, based on said time values, one or more parameters of said detection time period.

9. The apparatus of claim 8, wherein said processor is able to determine whether said signals correspond to a radar transmission based on said one or more parameters.

10. The apparatus of claim 8, wherein said timing evaluator comprises a detection counter to determine a duration of said detection time period by measuring the time period during which said detection signal is asserted.

11. The apparatus of claim 8, wherein said processor is able to determine the end of said detection time period based on said one or more time values.

12. The apparatus of claim 11, wherein said timing evaluator comprises a delay counter to measure a delay time period between the end of said detection time period and a time at which said processor determines a stamp-time value, said processor is able to determine the end of said detection time period based on a said stamp-time value and said delay time period.

13. A wireless transmission system comprising:
   a wireless station including:
      one or more dipole antennas to receive signals over a wireless communication channel;
      a comparator to compare an energy level of said signals to a threshold, and to assert a detection signal during a detection time period in which said energy level is higher than said threshold;
      a timing evaluator to determine, based on said detection signal, one or more time values relating to said signals, wherein the time values comprise a first time value corresponding to a first time period in which the energy level is above said threshold and a second time value corresponding to a time period between the end of the first time period and a time in which the second time value being retrieved; and
      a processor to determine, based on said time values, one or more parameters of said detection time period.

14. The wireless transmission system of claim 13, wherein said processor is able to determine whether said signals correspond to a radar transmission based on said one or more parameters.

15. The wireless transmission system of claim 13, wherein said timing evaluator comprises a detection counter to determine a duration of said detection time period by measuring the time period during which said detection signal is asserted.

16. The wireless transmission system of claim 13, wherein said processor is able to determine the end of said detection time period based on said one or more time values.

* * * * *